Feb. 11, 1941.     C. EISLER     2,231,617
WELDING MACHINE
Filed Aug. 18, 1938     3 Sheets-Sheet 1

INVENTOR
Charles Eisler,
BY
Wm. H. Canfield.
ATTORNEY

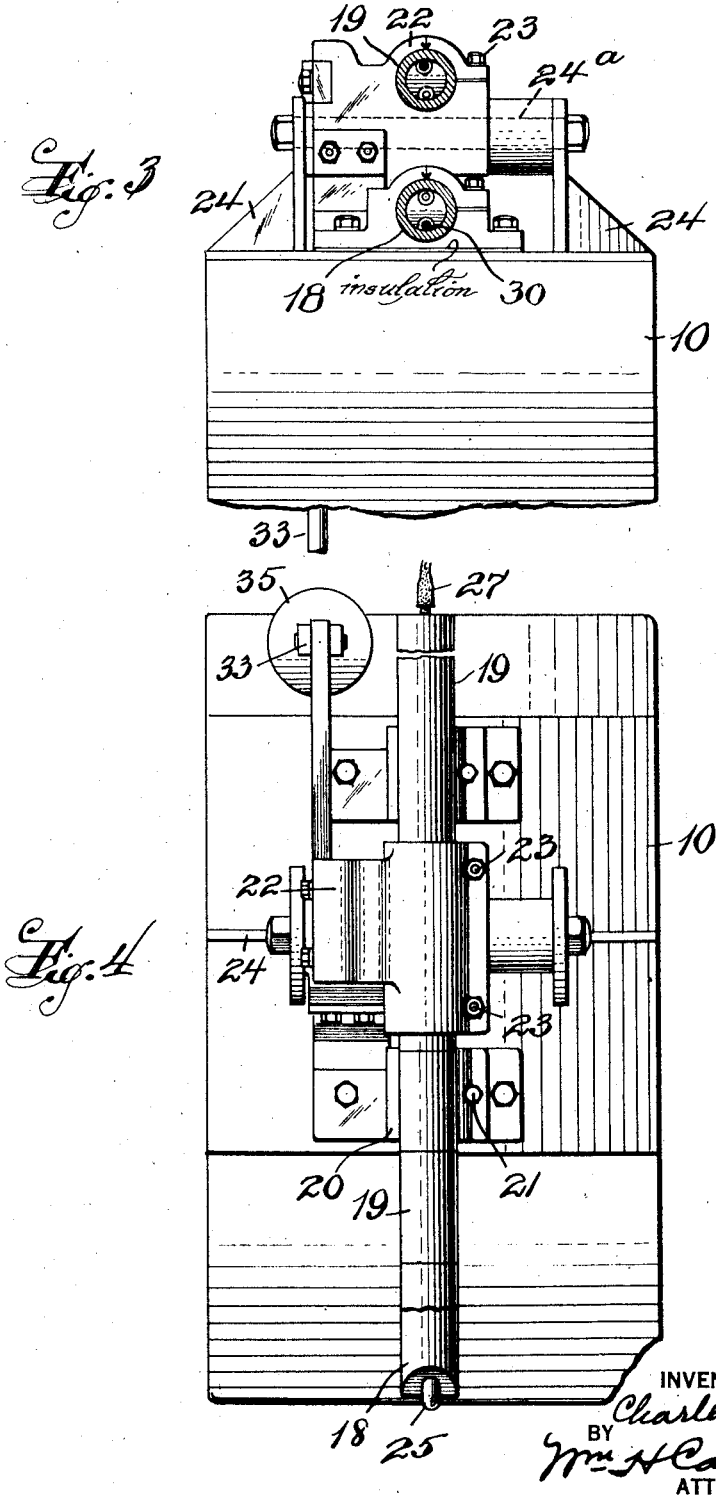

Feb. 11, 1941. C. EISLÉR 2,231,617
WELDING MACHINE
Filed Aug. 18, 1938 3 Sheets-Sheet 3

INVENTOR
Charles Eisler,
BY
Wm H Caufield.
ATTORNEY

Patented Feb. 11, 1941

2,231,617

UNITED STATES PATENT OFFICE 2,231,617

WELDING MACHINE

Charles Eisler, South Orange, N. J.

Application August 18, 1938, Serial No. 225,525

1 Claim. (Cl. 219—4)

This invention relates to an improved welding machine having adjustable horns which can be shifted to accommodate different sizes of sheets or pieces whereby more effective and rapid welding can be accomplished.

A further advantage of such adjustable horns is to vary the heat of the electrodes by thus increasing or decreasing the secondary loop reactance. In using the horns to vary the heat of the electrodes, taps are placed in the primary of the welding transformer, for further heat control.

The machine also provides for an adjustable separation of the pivots of the horns in addition to an adjusted length to provide a still greater scope of adjustment in order to accommodate a wide variation in the sizes of pieces to be welded.

Figure 1:
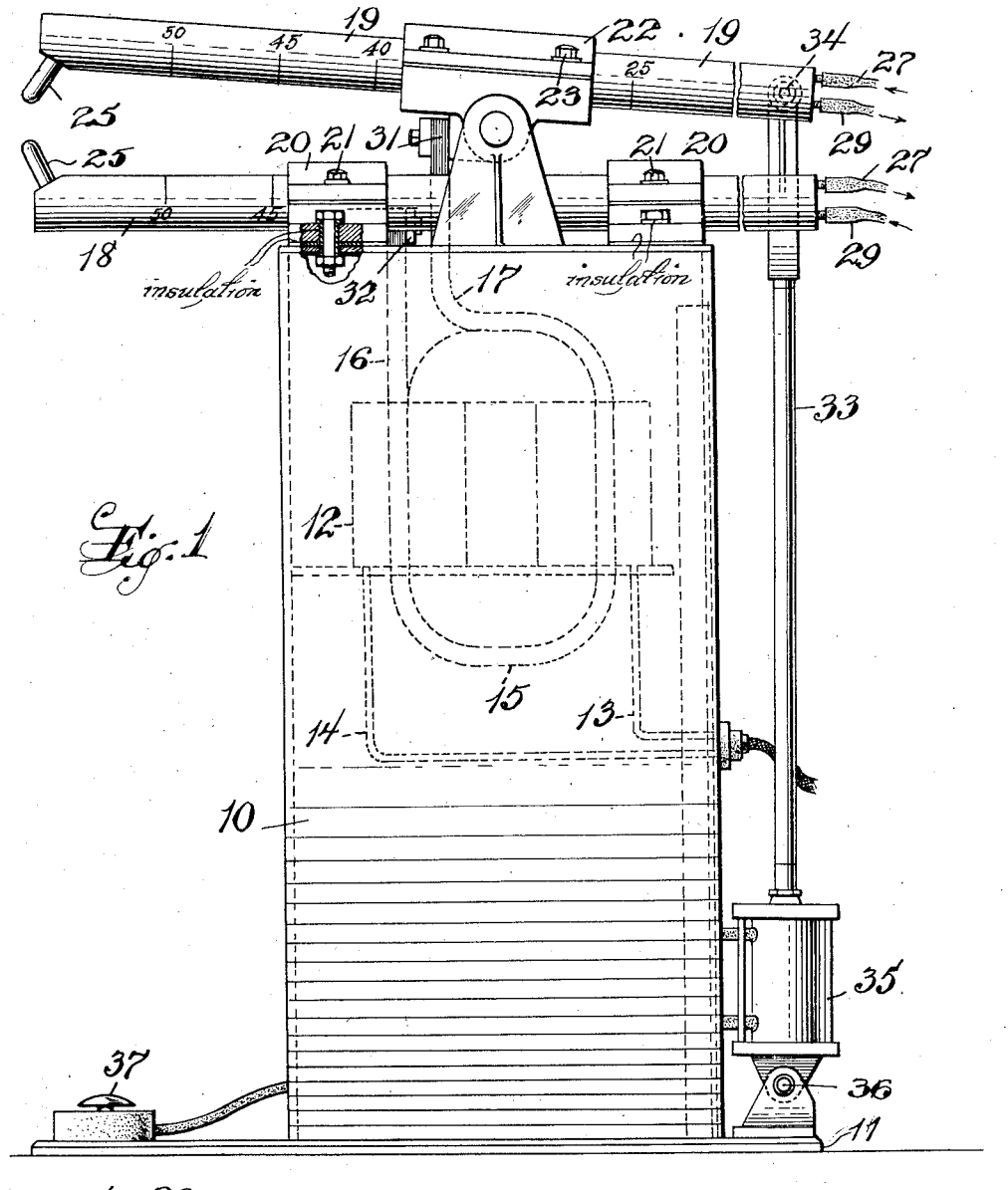
Figure 2:
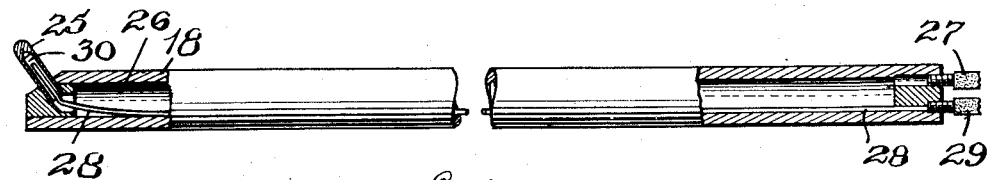
Figure 6:
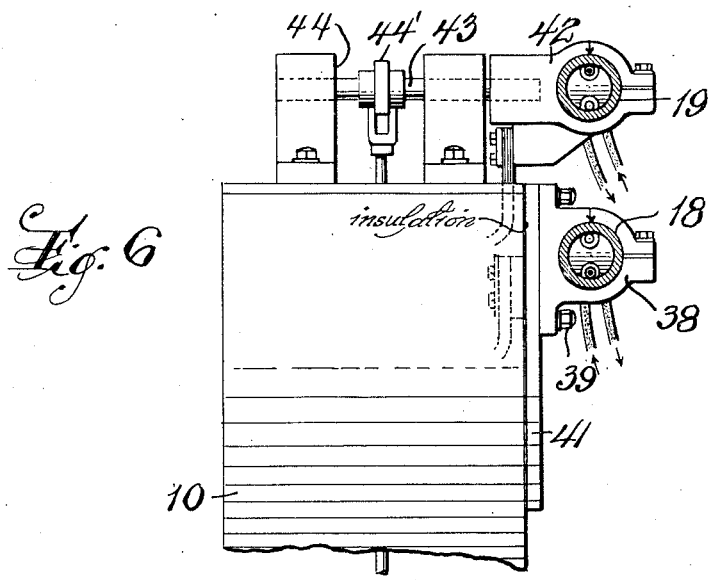
Figure 5:
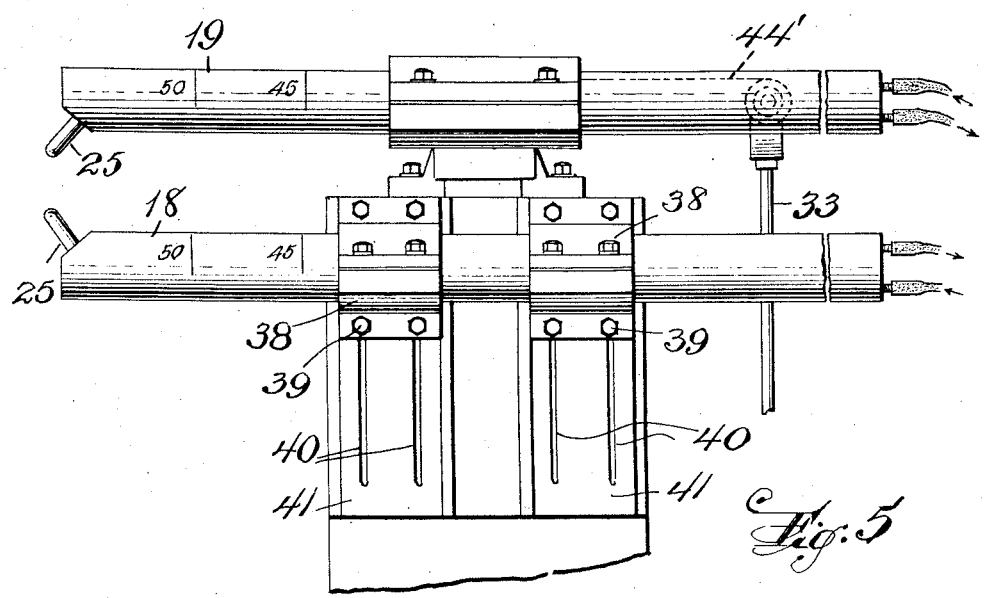

The invention is illustrated in the accompanying drawings. Figure 1 is a side view of a welding machine embodying my invention. Figure 2 is a side view partly in section of one of the horns used in the machine shown in Figure 1. Figure 3 is a vertical section on Figure 1 taken in front of the base of the machine and looking toward the machine. Figure 4 is a top view of the machine shown in Figure 1. Figure 5 is a side view of a modified form of machine. Figure 6 is a vertical section taken in front of the machine shown in Figure 5.

The machine that is illustrated is of the fabricated steel box type forming a base 10 having a floor plate 11 and having the customary transformer supported on the inside, the primary coil 12 being connected to the main circuit by the wires 13 and 14, the secondary coil 15 having taps 16 and 17 connected to the electrodes as hereinafter described.

The machine is provided with two welding horns 18 and 19. The horn 18 is secured in a clamp bearing or clamp bearings 20, the bolt 21 in each bearing causing the split bearing to tightly clamp the horn 18 in place, but permitting longitudinal adjustment of the horn when the bolt 21 is loosened. This form of clamp can be varied to suit requirements.

The horn 19 is secured in a clamp bearing 22 and held against movement by the pressure of the bearing due to the nut 23. When the nut 23 is released the horn 19 can be longitudinally adjusted. The clamp bearing is supported so that it can rock and it is shown supported on a shaft 24a supported in the bearings 24 on each side of the top of the base 10 and thus allowing the support of the upper horn to straddle the clamp of the lower horn.

The horns are supplied at their ends with welding tips 25. The horns are hollow and so are the tips to provide a channel for cooling fluid and for a fluid supply pipe. The hollow bore 26 of the horn is connected with the outlet water pipe 27 and the water inlet pipe 28 is supplied through the pipe 29. The inlet pipe 28 terminates short of the hollow part 30 of the tip 25 and this system maintains the horns at proper temperature.

The upper horn is shown connected to the tap 17 of the transformer at 31 and the lower horn is shown connected to the tap 16 at 32.

The rocking of the horn 19 to bring about welding contact of the tips 25 is shown as caused by a rod 33 pivotally connected at 34 to the horn 19 and actuated from a solenoid in a cylinder 35 which cylinder may rock, as at the pivot 36 to compensate for the movement of the rod 33. The solenoid is operated from the foot button 37 which is connected by contacts with the solenoid. This mechanism is not essential and is not new and a simple foot lever construction can be used if desired.

A modified form of construction is shown in Figures 5 and 6 which construction provides a further range of adjustment between the tips of the horns. The upper horn 19 and the lower horn 18 are the same as before described but they are mounted in a different way. The horns are disposed to one side of the base 10 and the upper horn rocks as in the prior construction herein described while the lower horn is held in clamp bearings that are vertically adjustable on the base to vary the distance from the bearing of the upper horn.

The lower horn 18 is secured in clamp bearings 38 which bearings are adjustable by reason of the bolts 39, which hold the bearings in place, being slidable in slots 40 in the plates 41 on the side of the base 10. The plates 41 are shown as the insulating support of the horns. The upper horn 19 is held in a clamp bearing 42 which is secured on a shaft 43 which can rock in the bearings 44 on the base 10. The shaft is provided with a lever 44' which extends to the rear and is secured to the rod 33 by which it is actuated.

The structures herein described are particularly convenient in that in the usual size of machine the throat depth for operating on pieces to be welded can be varied from 12 inches to 48 inches. The flexibility of the machine is thereby greatly increased as large or small sheets of metal may be welded by varying the length of the horns to fit the particular job. This flexibility and convenience in using the machine is possible by reason of the construction which extends the ends of the horns beyond the limits of the machine base, giving greater scope of adjustment, and also accessibility for inspection, adjustment and repair.

In addition to this the heat at the electrodes may be varied over a wide range through a large number of steps. The horns are shown marked to indicate the proper places for setting the horns, the markings showing the principal ratings, namely from 50 to 25 k. v. a. The adjustment to the proper rating coupled with use of the taps in the primary of the welding transformer increases or decreases the secondary loop inductance.

I claim:

A welding machine comprising a base, a pivotally mounted clamp bearing on the top of the base, a horn longitudinally adjustable in the clamp bearing, a vertically adjustable second clamp bearing secured to the side of the base, whereby the distance between the bearings can be varied, a second horn in the second clamp bearing, both horns extending beyond the base at the front and rear of the base.

CHARLES EISLER.